(12) United States Patent  (10) Patent No.: US 7,984,816 B2
Ragsdale  (45) Date of Patent: Jul. 26, 2011

(54) LOAD STABILIZER FOR AN AUTOMOBILE

(76) Inventor: Frank Ragsdale, Winston-Salem, NC (US)

( * ) Notice: Subject to any disclaimer, the term of this patent is extended or adjusted under 35 U.S.C. 154(b) by 0 days.

(21) Appl. No.: 12/730,050

(22) Filed: Mar. 23, 2010

(65) Prior Publication Data

US 2010/0171285 A1   Jul. 8, 2010

Related U.S. Application Data

(63) Continuation-in-part of application No. 11/737,980, filed on Apr. 20, 2007, now Pat. No. 7,748,548.

(60) Provisional application No. 61/210,612, filed on Mar. 23, 2009.

(51) Int. Cl.
*B61G 1/00* (2006.01)
*B62D 61/12* (2006.01)
*B60D 1/00* (2006.01)

(52) U.S. Cl. ............ 213/75 R; 180/209; 280/504

(58) Field of Classification Search ........ 213/75 R, 213/77, 78, 96, 98, 152; 280/433, 483, 489, 280/498, 501, 504, 508, 509; 180/209
See application file for complete search history.

(56) References Cited

U.S. PATENT DOCUMENTS

| 2,847,233 | A | 8/1958 | Minton |
| 4,368,899 | A | 1/1983 | Smalley et al. |
| 4,886,391 | A | 12/1989 | Ragsdale |
| 4,982,488 | A | 1/1991 | Ragsdale |
| 7,108,272 | B1 * | 9/2006 | Gurtler .................. 280/489 |
| 7,243,747 | B2 * | 7/2007 | Bender et al. ............ 180/15 |

OTHER PUBLICATIONS

Notice of Allowance mailed May 17, 2010 for U.S. Appl. No. 11/737,980.
Office Action mailed Oct. 26, 2009 for U.S. Appl. No. 11/737,980.

* cited by examiner

*Primary Examiner* — S. Joseph Morano
*Assistant Examiner* — R. J. McCarry, Jr.
(74) *Attorney, Agent, or Firm* — Olive Law Group, PLLC (57) ABSTRACT

A load stabilizer for an automobile is provided. The load stabilizer includes a hitch assembly having an elongate cross member that extends between opposing frame rails of the automobile and that is pivotable about an axis of rotation defined along a length of the cross member in response to a load applied upon the hitch assembly. A first torsion bar is carried on a first end by the cross member and on a second end by the automobile frame for retarding load variations on the hitch assembly.

18 Claims, 7 Drawing Sheets

LOAD STABILIZER FOR AN AUTOMOBILE

PRIORITY CLAIM

This application is a continuation-in-part of U.S. patent application Ser. No. 11/737,980 filed on Apr. 20, 2007, and this application also claims priority to U.S. Provisional Patent Application No. 61/210,612 filed on Mar. 23, 2009, the contents of both of which are incorporated herein.

TECHNICAL FIELD

The presently disclosed subject matter is directed towards a load stabilizer for an automobile, and more particularly, towards a load stabilizer for an automobile having a pivotable hitch assembly with force retarding members for responding to load variations on the hitch assembly.

BACKGROUND

Automobiles under towing or carrying a load are subjected to increased structural forces on the automobile's frame. Loads are typically carried on the rear portion of the automobile, either as a trailer being towed behind the automobile or by carrying cargo within the rear of the automobile such as in a truck bed. The suspension under the rear of the automobile must bear the load associated with the trailer or cargo. This causes the front end of the automobile to tilt upwards, reducing the amount of weight on the front of the automobile, and the rear of the automobile to compress downwards, thus causing deflection of the rear suspension of the automobile. This reduced weight on the front of the automobile causes a corresponding reduction in front traction and thus makes driving the automobile more difficult. In addition, uneven weight distribution on the automobile makes the automobile difficult to maneuver and causes stress or failure on associated automobile components.

Various devices have been invented to address the weight distribution issues associated with towing or carrying a load, however, these devices suffer from various drawbacks including cost, size, and performance.

Accordingly, there remains a need for load stabilizer that addresses the various disadvantages associated with previous devices.

SUMMARY

According to one aspect of the disclosed subject matter, a load stabilizer for an automobile is provided. The load stabilizer includes a hitch assembly having an elongate cross member that extends between opposing frame rails of the automobile and that is pivotable about an axis of rotation defined along a length of the cross member in response to a load applied upon the hitch assembly. A first torsion bar is carried on a first end by the cross member and on a second end by the automobile frame for retarding load variations on the hitch assembly.

According to another aspect of the disclosed subject matter, each of the opposing frame rails carries a housing for receiving the hitch assembly therein.

According to another aspect of the disclosed subject matter, the cross member defines a first aperture for slideably receiving the first end of the first torsion bar.

According to another aspect of the disclosed subject matter, the second end of the first torsion bar is carried by a rear axle of the automobile.

According to another aspect of the disclosed subject matter, the hitch assembly includes a fastener for fixedly engaging the first torsion bar.

According to another aspect of the disclosed subject matter, the hitch assembly includes at least one receiver for receiving a coupler for coupling to a trailer.

According to another aspect of the disclosed subject matter, the coupler comprises a sleeve carried by one of the automobile or the trailer and also comprises a shaft for being engageably inserted into the sleeve and carried by the other of the automobile or the trailer.

According to another aspect of the disclosed subject matter, the hitch assembly includes a wheeled assembly that is retractable from a first position in which the wheeled assembly does not contact a surrounding road surface and a second position in which the wheeled assembly contacts the surrounding road surface.

According to another aspect of the disclosed subject matter, the hitch assembly includes a force extension assembly in communication with the wheeled assembly.

According to another aspect of the disclosed subject matter, the wheeled assembly is pivotable about the axis of rotation of the hitch assembly.

According to another aspect of the disclosed subject matter, the hitch assembly includes a second torsion bar that is carried on a first end by the cross member and on a second end by the automobile frame, and further wherein each of the first and second torsion bars are positioned on opposing ends of the cross member.

According to one aspect of the disclosed subject matter, a hitch assembly for an automobile is provided. The hitch assembly includes a cross member that extends between opposing frame rails of the automobile and that is pivotable about an axis of rotation defined along a length of the cross member. A receiver is carried by the cross member for receiving a coupler for attaching to a trailer and the receiver pivots about the axis of rotation in response to a load being applied thereon.

According to another aspect of the disclosed subject matter, the receiver defines at least one slot for receiving the coupler.

According to another aspect of the disclosed subject matter, the hitch assembly includes a first torsion bar carried on a first end by the cross member and on a second end by a frame of the automobile for retarding load variations on the hitch assembly.

According to another aspect of the disclosed subject matter, the hitch assembly includes a wheeled assembly that is retractable from a first position in which the wheeled assembly does not contact a surrounding road surface and a second position in which the wheeled assembly contacts the surrounding road surface.

According to another aspect of the disclosed subject matter, the hitch assembly includes a force extension assembly in communication with the wheel assembly.

According to another aspect of the disclosed subject matter, a load stabilizer for an automobile is provided. The load stabilizer includes a hitch assembly having an elongate cross member that extends between opposing frame rails of the automobile and that is pivotable about an axis of rotation defined along a length of the cross member in response to a load applied upon the hitch assembly, a first torsion bar extending between a first end of the cross member and the automobile frame, a second torsion bar extending between a second end of the cross member and the automobile frame, a receiver carried by the cross member for receiving a coupler for attaching to a trailer where the receiver pivots about the axis of rotation in response to a load being applied thereon, and a retractable wheel assembly that is retractable from a first position in which the wheeled assembly does not contact a surrounding road surface and a second position in which the wheeled assembly contacts the surrounding road surface.

According to another aspect of the disclosed subject matter, the wheeled assembly is pivotable about the axis of rotation.

According to another aspect of the disclosed subject matter, the receiver defines at least one slot for receiving a coupler.

According to another aspect of the disclosed subject matter, the coupler comprises a sleeve carried by one of the automobile and a trailer and also comprises a shaft carried by the other of the automobile and the trailer for being engageably inserted into the sleeve.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

The presently disclosed subject matter now will be described more fully hereinafter with reference to the accompanying drawings, in which some, but not all embodiments are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

A load stabilizer for an automobile 1 is illustrated throughout the drawings and is generally designated 10. The load stabilizer 10 generally includes a hitch assembly 12 having a cross member 14 that extends between opposing frame rails 2, 3, of the automobile 1. The cross member 14 is pivotable about a pivot axis of rotation 16 that is defined along a length of the cross member 14. In this manner, cross member 14 is pivotable about axis of rotation 16 in response to a load being applied upon the hitch assembly 12. A first torsion bar 20 is carried by the cross member 14 and extends towards a frame portion of the automobile 1 and is provided for retarding loads being applied onto the hitch assembly 12.

The cross member 14 is carried by housings 26 which form a race surface for allowing pivotable movement of the cross member 14 about the pivot axis of rotation 16 within housings 26. The housings 26 are carried by the opposing frame rails 2, 3 of the automobile 1 and may be fastened by welding, the use of threadable fasteners, collars, or any other suitable method of fastening the housings 26 to the frame rails 2, 3.

In one embodiment, a first end 22 of the first torsion bar 20 is carried by the cross member 14 by being slideably received within an aperture 28 defined in the cross member 14. The first torsion bar 20 may be allowed to free float within aperture 28 or the torsion bar 20 may be fixed into place by tightening fasteners 30 which cause engagement with the torsion bar 20.

Figure 1:
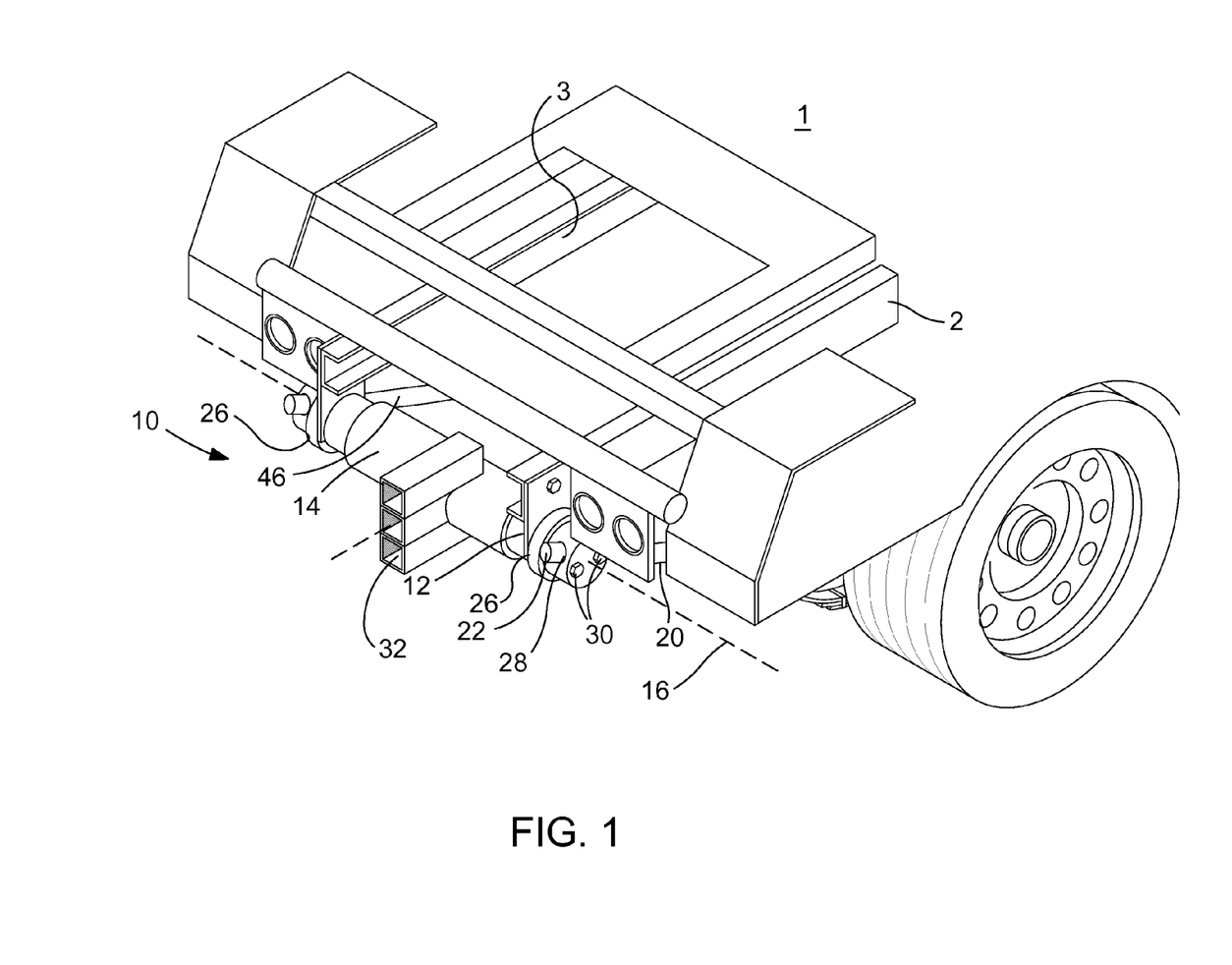
FIG. 1 is a perspective view of a hitch assembly according to one embodiment of the presently disclosed subject matter.
Figure 3:
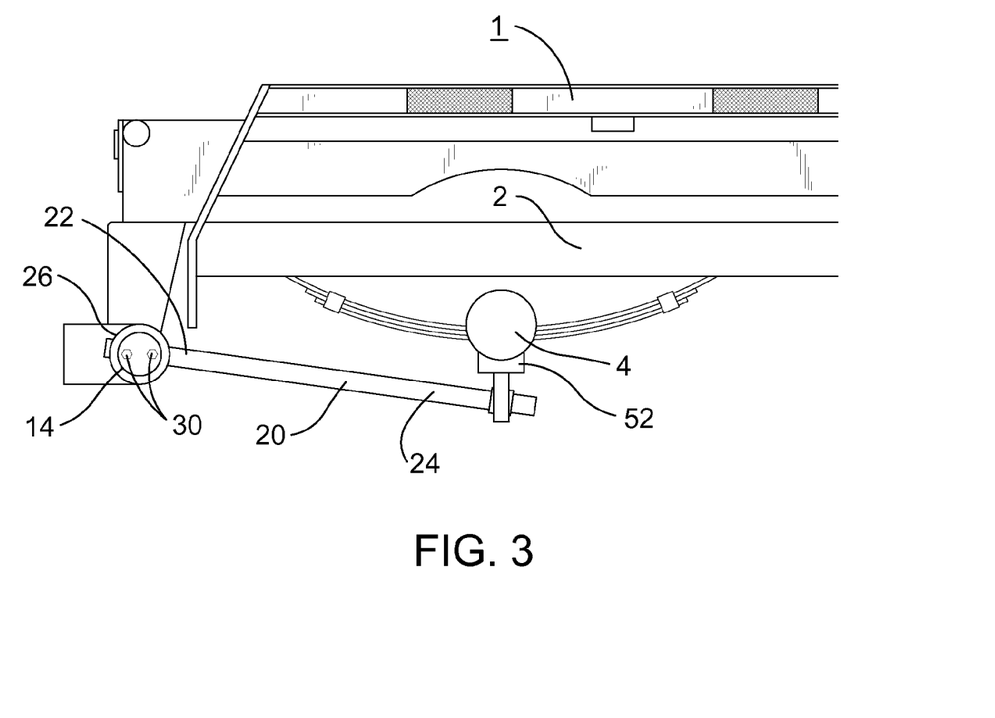
FIG. 3 is an enlarged side view of the load stabilizer according to FIG. 2 with the tire and wheel of the automobile removed for illustration purposes according to one embodiment of the presently disclosed subject matter.

As shown in FIG. 3, a second end 24 of the first torsion bar 20 is carried by the automobile frame on a rear axle 4 of the automobile 1, and more particularly, is carried by a pivotable joint 52 that is attached to the axle 4. The pivotable joint 52 is any appropriate joint that allows movement of the torsion bar 20, and in some embodiments may be a heim joint design. A second torsion bar 46 is illustrated in FIG. 1 and may be provided for applying additional load retarding forces. The second torsion bar 46 may be identical to the first torsion bar 20. In an embodiment, each of the first torsion bar 20 and second torsion bar 46 may be provided on opposing ends of cross member 14. The torsion bar 20 may have generally tapered ends that are slideably received within the pivotable joint 52 and are configured such that the major diameter of the torsion bar 20 is larger than the diameter of a receiving opening of the joint 52 such that the entire length of torsion bar 20 cannot slide through joint 52. In one embodiment, additional torsion bars may be provided and may be configured for being carried in proximity to either of the first torsion bar 20 or second torsion bar 46.

As shown in FIG. 1, the hitch assembly 12 includes at least one receiver 32 for receiving a coupler 34. The receiver 32 is an elongate slot in communication with the cross member 14, and as shown in FIG. 1, may include a plurality of slots in vertical alignment such that the positioning of the coupler 34 may be varied according to the height of an attached trailer 7 or load being attached to by placing coupler 34 into a desired slot.

Figure 2:
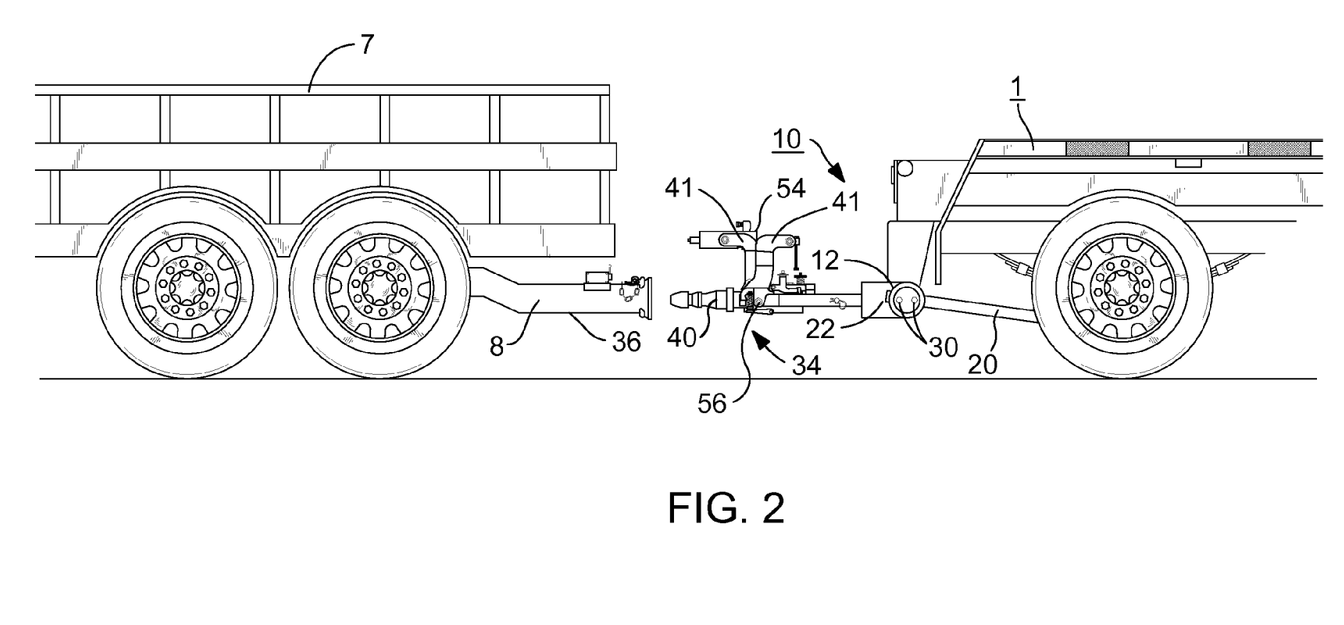
FIG. 2 is a side view of a load stabilizer connecting an automobile with a trailer according to one embodiment of the presently disclosed subject matter.

In an embodiment shown in FIG. 2, the coupler 34 includes a sleeve 36 that is attached to the trailer 7 and a shaft 40 that is provided for being engageably inserted into the sleeve 36, thereby coupling the sleeve 36 and shaft 40 together. The coupler 34 includes a pair of arms 41, one of each pair being attached to the sleeve 36 and one pair to the shaft 40. A force cylinder 54 is provided between the arms 41 and is responsive to movement of either pair of arms 41. Each of the sleeve 36, shaft 40, and arms 41 are pivotable about a pivot joint 56, such that when the sleeve 36 or shaft 40 pivots about pivot joint 56, the force cylinder 54 imparts load responsive forces to the coupler 34. Further details on the coupler may be found in commonly owned U.S. patent application Ser. No. 11/737, 980 which was filed on Apr. 20, 2007 and the present application claims priority to, the contents of which are hereby incorporated by reference.

Figure 4A:
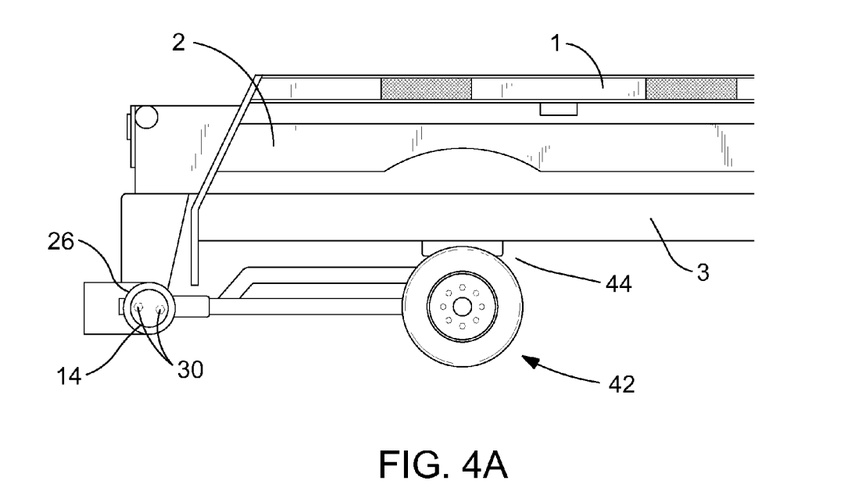
FIG. 4A is a side view of the load stabilizer according to FIG. 2 having a retractable wheel assembly in communication therewith and in a first position in which the wheel assembly does not contact a surrounding road surface according to another embodiment of the presently disclosed subject matter.
Figure 4B:
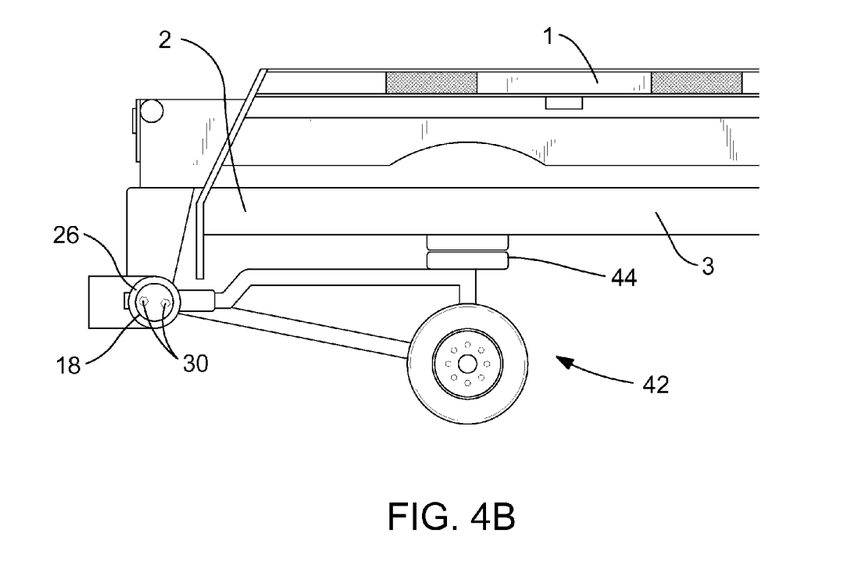
FIG. 4B is a side view of the load stabilizer according to FIG. 2 having a retractable wheel assembly in communication therewith and in a second position in which the wheel assembly contacts a surrounding road surface according to another embodiment of the presently disclosed subject matter.

As shown in FIG. 4A and FIG. 4B, the load stabilizer 10 includes a wheeled assembly 42 that is retractable from a first position in which the wheeled assembly 42 does not contact a surrounding road surface, as shown in FIG. 4A, and a second position in which the wheeled assembly 42 contacts the surrounding road surface, as shown in FIG. 4B. The wheeled assembly 42 may be retracted by any appropriate mechanism, including a manually operated, pneumatically operated, hydraulically operated, or electrically operated mechanism. A force extension assembly 44 is in communication with the wheeled assembly 42 and is positioned between the wheeled assembly 42 and any other load bearing surface, such as frame rails 2, 3. Force extension assembly 44 may include air bags, electrical extension assemblies, mechanical levers, springs, shocks, or any other length responsive device. The wheeled assembly 42 is pivotable about the axis of rotation 16 of the cross member 14. In this manner, when the wheeled assembly 42 is in the retracted position and in contact with the road surface, the wheeled assembly 42 further provides responsive loading upon pivoting movement of the hitch assembly 12 about the pivot axis of rotation 16.

The force cylinder 54 of the coupler 34 is operable for receiving pneumatic or hydraulic input to vary the forces exerted on arms 41. In this manner, pneumatic or hydraulic input into the force cylinder 54 causes the cylinder 54 to expand thereby pivoting the sleeve 36 and shaft 40 about pivot joint 56 in a direction towards the road surface. This causes a corresponding pivot of the cross member 14 about pivot axis of rotation 16 which then imparts torsional stresses on the first torsion bar 20 and second torsion bar 46. The torsional bars 20, 46 then deflect and shift weight towards the front of the automobile 1. Similarly, pivoting of the sleeve 36 and shaft 40 in a general upwards direction away from the road surface imparts a corresponding pivot of the cross member 14 about pivot axis of rotation 16. In one embodiment, the pneumatic or hydraulic input may be a pneumatic or hydraulic input source in communication with cylinder 54, and in another embodiment, that input source may be in communication with the wheeled assembly 42 for retracting the wheeled assembly 42 between its first and second positions.

Figure 5A:
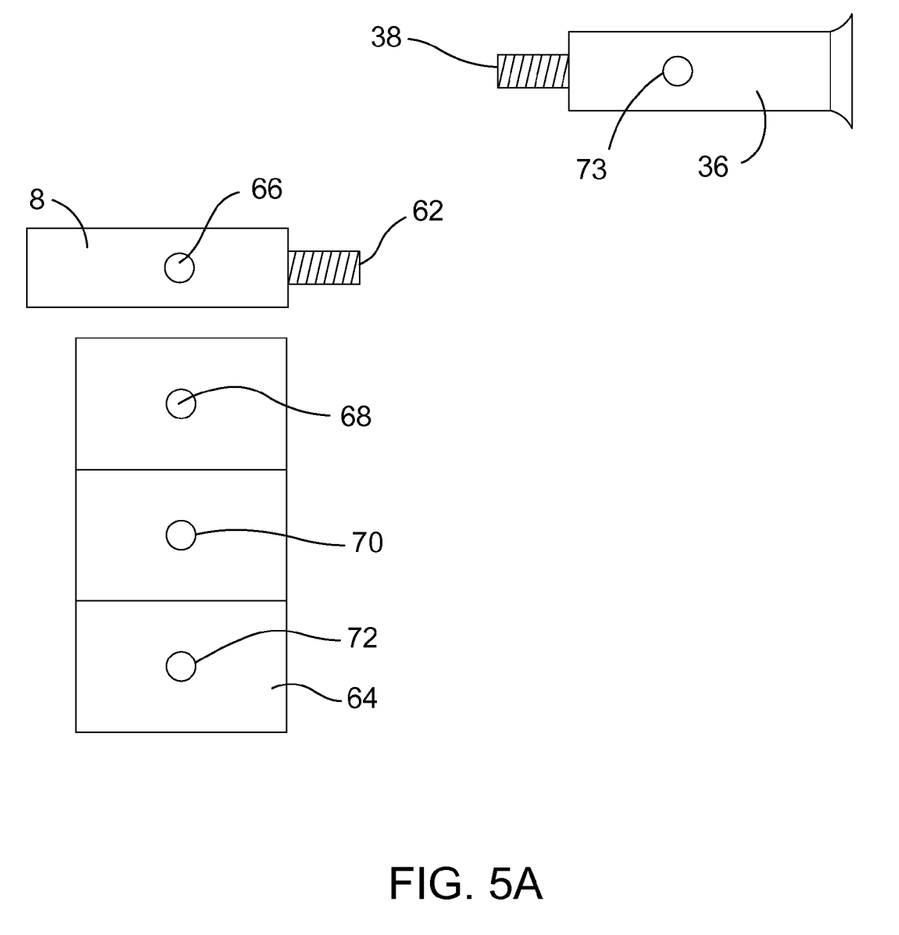
FIG. 5A is an exploded view of a trailer tongue coupler having adjustable height characteristics according to one embodiment of the presently disclosed subject matter.
Figure 5B:
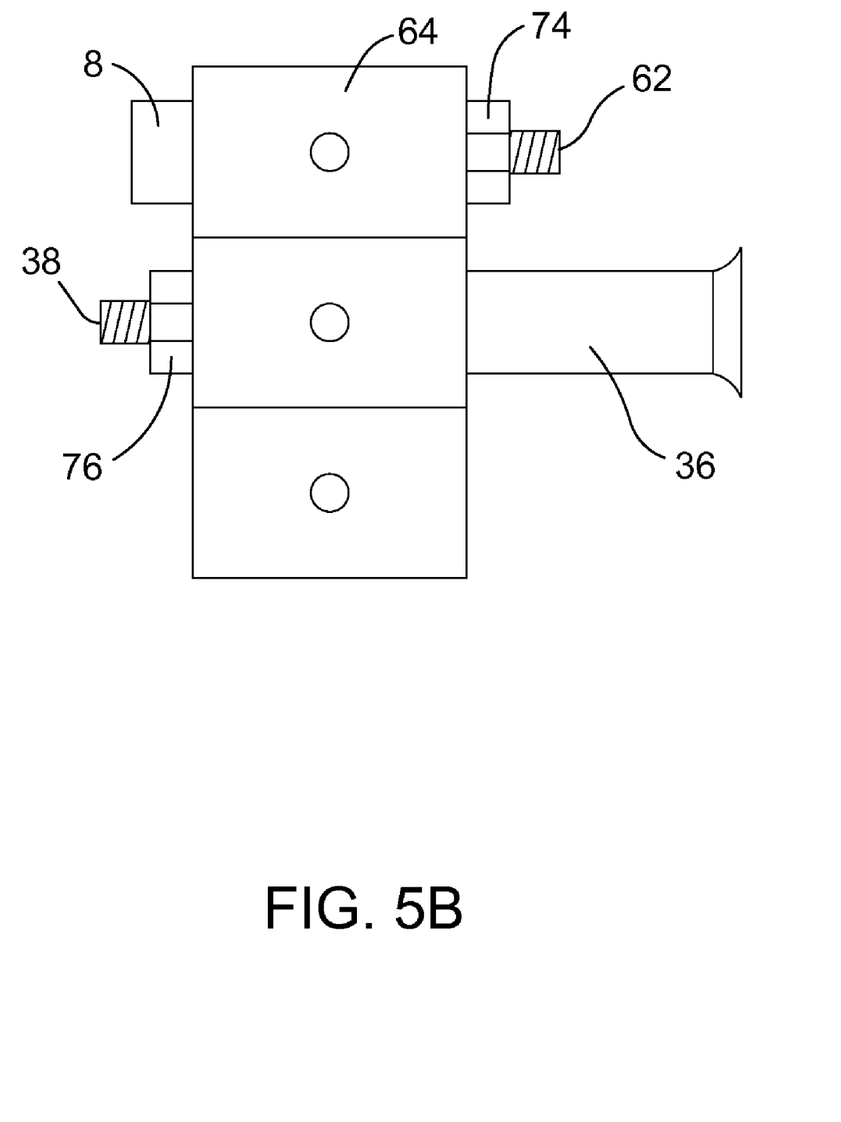
FIG. 5B is an assembled view of the trailer tongue coupler as illustrated in FIG. 5A that is positioned at a first height according to one embodiment of the presently disclosed subject matter.
Figure 5C:
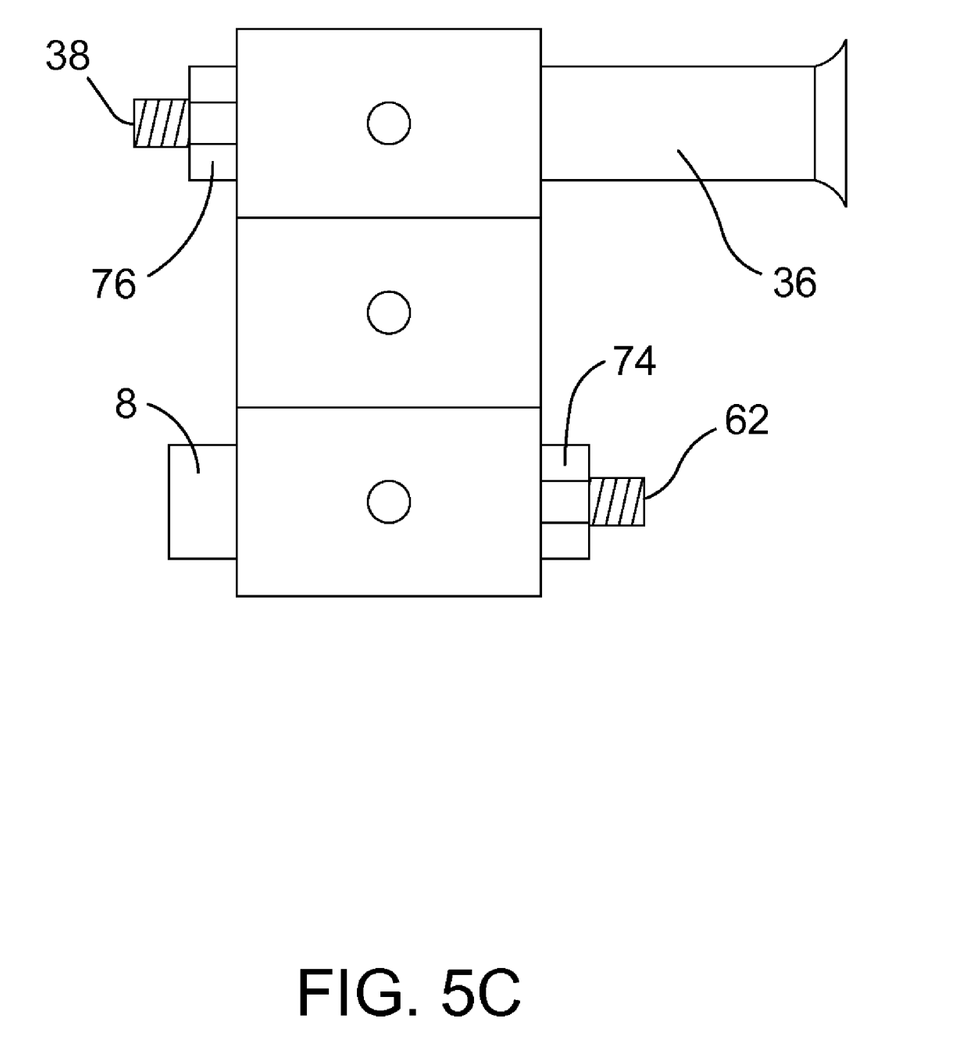
FIG. 5C is an assembled view of the trailer tongue coupler as illustrated in FIG. 5A that is positioned at a second height according to one embodiment of the presently disclosed subject matter.

An alternate embodiment is shown in FIGS. 5A, 5B, and 5C, in which the sleeve 36 of coupler 34 is configured such that the position of the sleeve 36 may be adjusted to a desired height. The tongue 8 of the trailer 7 has a threaded shank 62 extending from an end thereof and an aperture 66 defined across a horizontal axis. The tongue 8 is configured for sliding within spacer 64 which is provided with a plurality of receiver slots for receiving tongue 8. As shown in FIG. 5A, the spacer 64 includes three receiver slots, but in appropriate embodiments, may have more or less as desired. Apertures 68, 70, and 72 may be defined in the spacer 64. The sleeve 36 also includes a threaded shank 38 extending from an end thereof and an aperture 73 defined across a horizontal axis. As shown in FIG. 5B, the position of sleeve 36 may be varied by placing the sleeve 36 into a selected receiver slot of the spacer 64. Spacer 64 is fastened to tongue 8 by receiving a threaded fastener, such as nut 74, on the threaded shank 62, thereby securing spacer 64 against the tongue 8. A pin may be inserted through aperture 66 and the selected one of aperture 68, 70, or 72 for providing increased protection. In this manner, the spacer 64 may be positioned such that the receiver slots of the spacer are positioned above or below the tongue 8. Similarly, the sleeve 36 is then slideably received within the spacer 64 in a desired receiver slot, and is likewise fastened to spacer 64 by receiving a threaded fastener, such as nut 76, on the threaded shank 76, thereby securing coupler 36 to spacer 64. A pin may be inserted through aperture 73 and the selected one of aperture 68, 70, or 72 for providing increased protection. Each of the tongue 8 and sleeve 36 may include a flange for resting against spacer 64 and restricting any movement of either spacer 64, tongue 8, or sleeve 36 once assembled. In another embodiment, the spacer 64 may be positioned such that the coupler 36 may be horizontally offset from tongue 8. In this manner, the disclosed invention offers multiple position adjustments for both the hitch assembly 12 and the coupler sleeve 36 to fit any variety of trailers or automobiles.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A load stabilizer for an automobile comprising:
a hitch assembly having an elongate cross member that extends between opposing frame rails of the automobile and that is pivotable about an axis of rotation defined along a length of the cross member in response to a load applied upon the hitch assembly; and
a first torsion bar carried on a first end by the cross member and on a second end by an axle of the automobile for retarding load variations on the hitch assembly.

2. The load stabilizer according to claim 1, wherein each of the opposing frame rails carries a housing for receiving the hitch assembly therein.

3. The load stabilizer according to claim 2, wherein the cross member defines a first aperture for slideably receiving the first end of the first torsion bar.

4. The load stabilizer according to claim 3, wherein the second end of the first torsion bar is carried by a rear axle of the automobile.

5. The load stabilizer according to claim 3, wherein the hitch assembly includes a fastener for fixedly engaging the first torsion bar.

6. The load stabilizer according to claim 3, further including at least one receiver for receiving a coupler for coupling to a trailer.

7. The load stabilizer according to claim 6, wherein the coupler comprises a sleeve carried by one of the automobile or the trailer and a shaft for being engageably inserted into the sleeve and carried by the other of the automobile or the trailer.

8. The load stabilizer according to claim 3, further including a wheeled assembly carried by the hitch assembly that is retractable from a first, stowed position and a second, lowered position.

9. The load stabilizer according to claim 8, further including a force extension assembly in communication with the wheeled assembly.

10. The load stabilizer according to claim 9, wherein the wheeled assembly is pivotable about the axis of rotation of the hitch assembly.

11. The load stabilizer according to claim 10, further including a second torsion bar that is carried on a first end by the cross member and on a second end by the axle, and further wherein each of the first and second torsion bars are positioned on opposing ends of the cross member.

12. A load stabilizer for an automobile comprising:
- a hitch assembly having an elongate cross member that is pivotable about an axis of rotation defined along a length of the cross member in response to a load applied upon the hitch assembly;
- a first torsion bar extending between the cross member and an axle of the automobile;
- a receiver carried by the cross member for receiving a coupler for attaching to a trailer, wherein the receiver pivots about the axis of rotation in response to a load being applied thereon; and
- a retractable wheel assembly carried by the hitch assembly and that is retractable from a first, raised position and a second, lowered position.

13. The load stabilizer according to claim 12, wherein the wheel assembly is pivotable about the axis of rotation.

14. The load stabilizer according to claim 12, wherein the receiver defines at least one slot for receiving the coupler.

15. The load stabilizer according to claim 14, wherein the coupler comprises a sleeve carried by one of the automobile and a trailer and a shaft carried by the other of the automobile and the trailer for being engageably inserted into the sleeve.

16. A load stabilizer for an automobile comprising:
- a hitch assembly having an elongate cross member that is pivotable about an axis of rotation that is generally parallel with a length of the cross member in response to a load applied upon the hitch assembly;
- a first torsion bar configured for being carried on a first end by the cross member and on a second end by an axis of the automobile for retarding load variations on the hitch assembly; and
- a wheeled assembly carried by the hitch assembly.

17. The load stabilizer according to claim 16, wherein the wheeled assembly is pivotable about the axis of rotation of the hitch assembly.

18. The load stabilizer according to claim 17, further including a force extension assembly in communication with the wheeled assembly.

* * * * *